Jan. 1, 1946. L. C. WASSON 2,392,074
SEMIAUTOMATIC TURRET LATHE
Filed Sept. 10, 1943 3 Sheets-Sheet 1
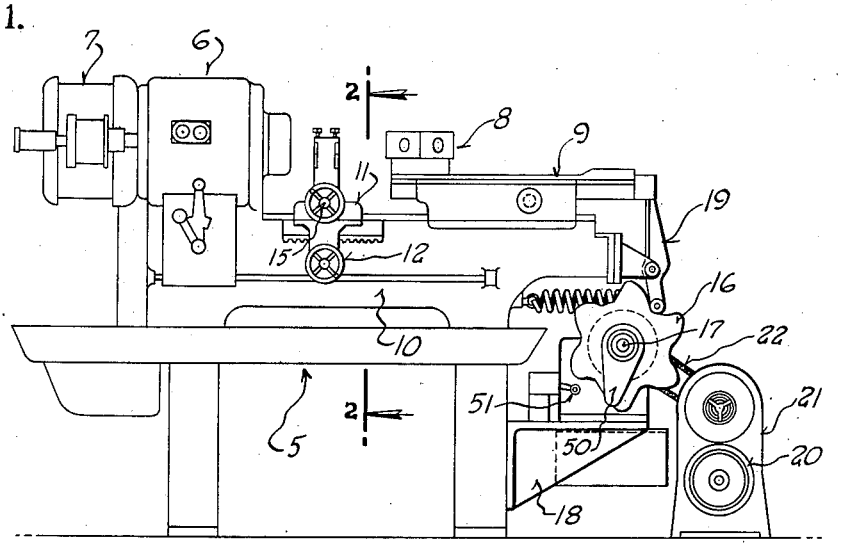
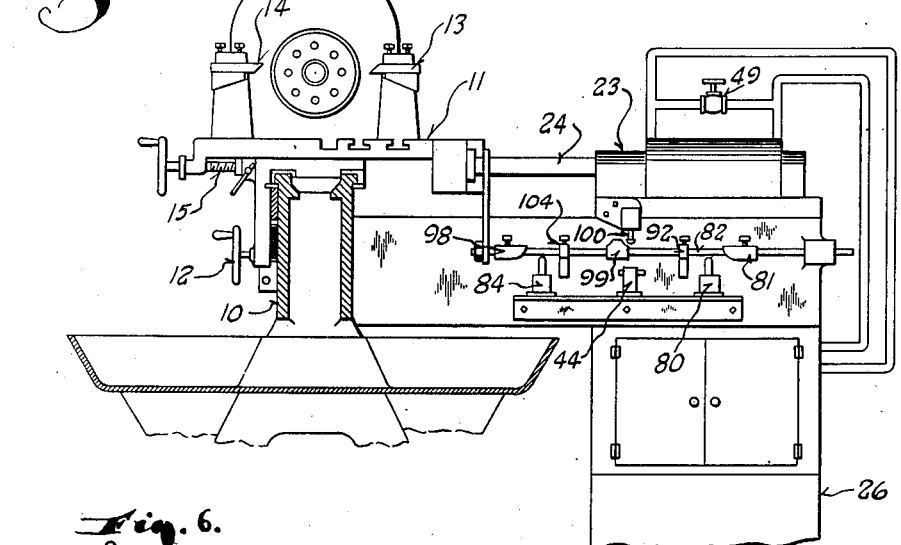
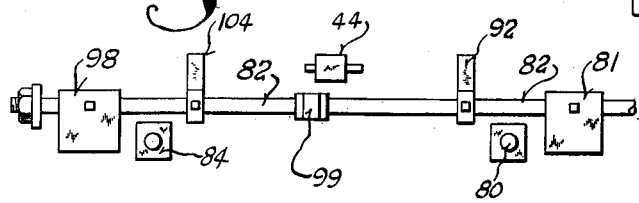
Inventor
Loerwood C. Wasson
By Milton Jones
Attorney

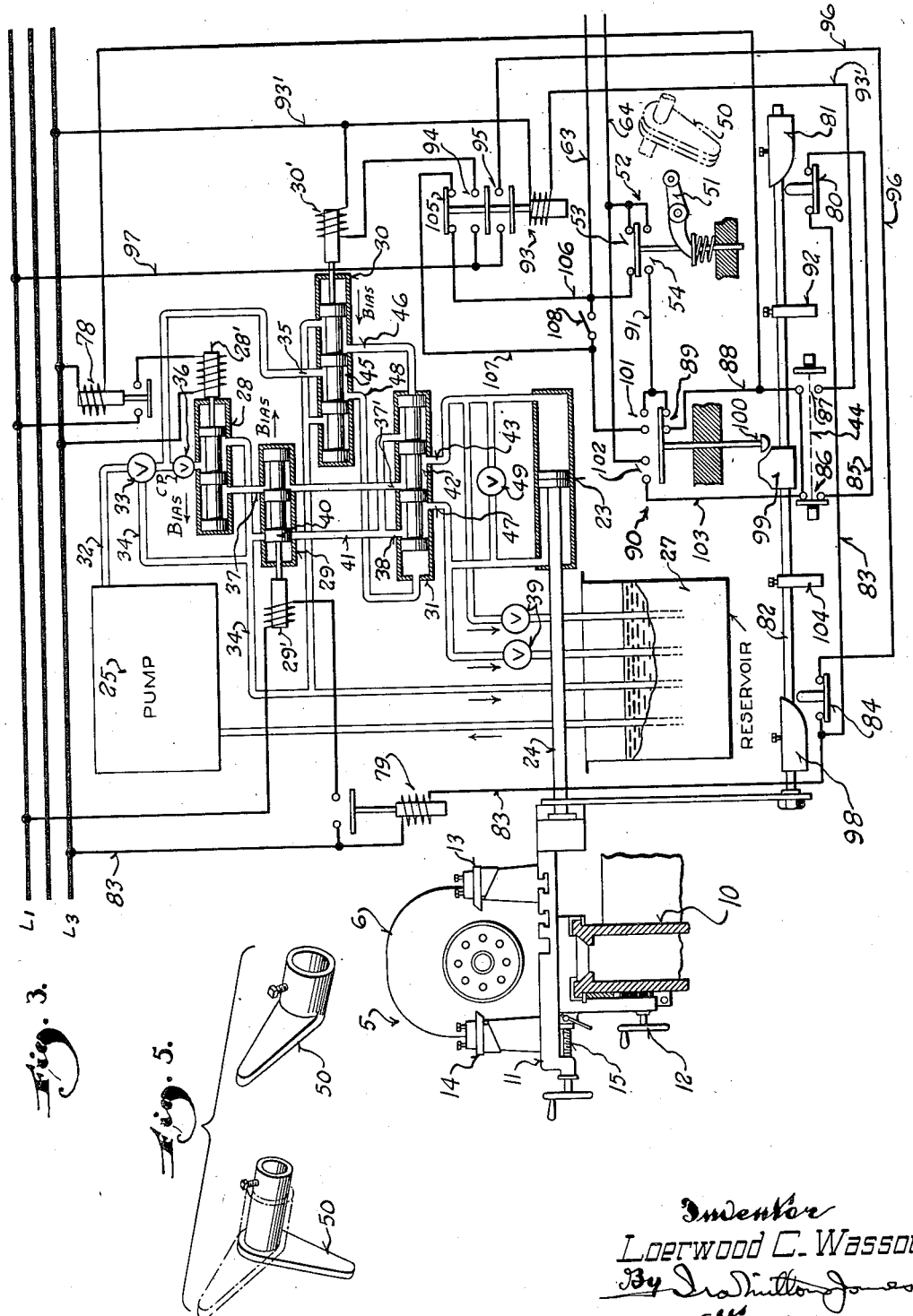

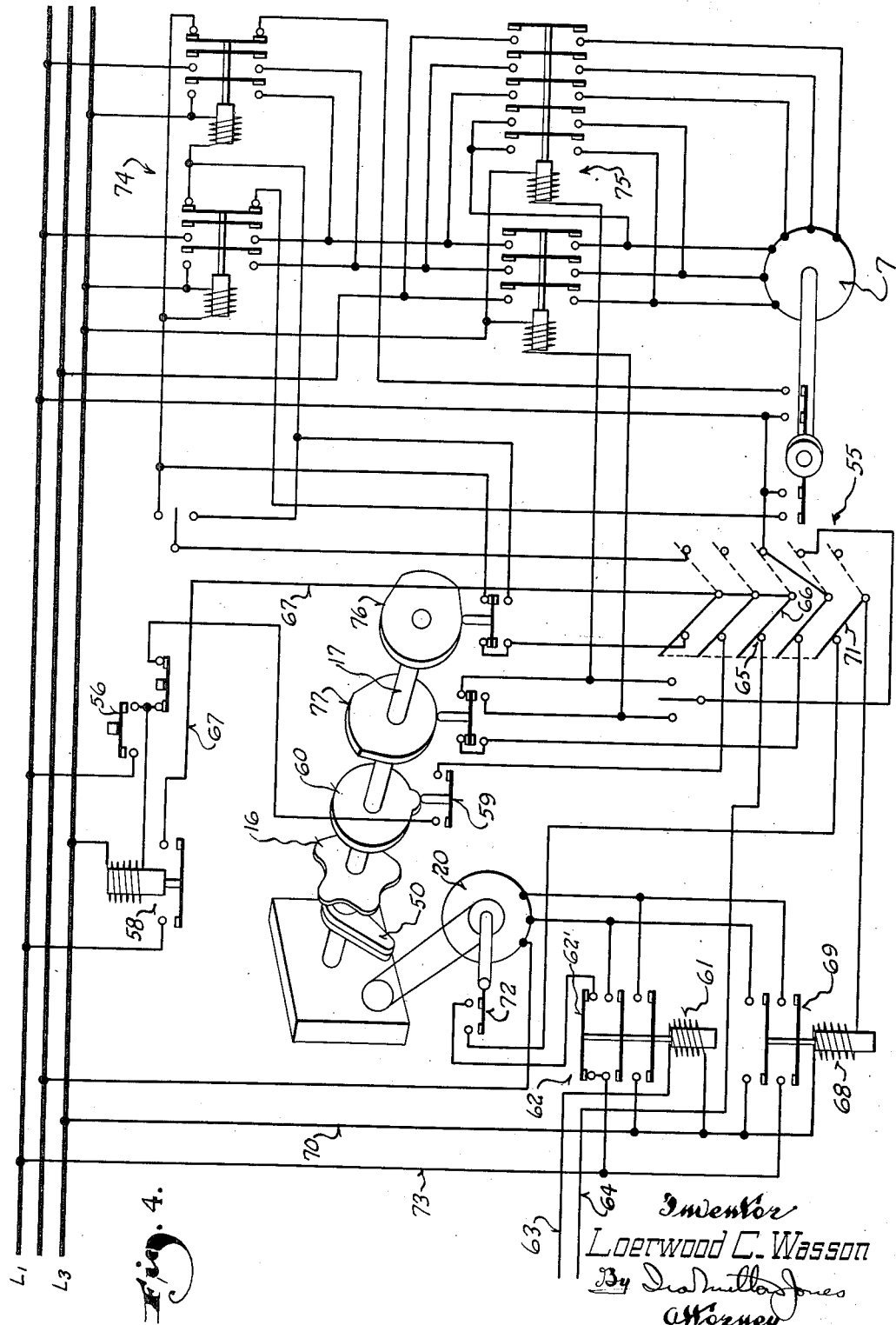

Patented Jan. 1, 1946

2,392,074

UNITED STATES PATENT OFFICE 2,392,074

SEMIAUTOMATIC TURRET LATHE

Loerwood C. Wasson, Wauwatosa, Wis., assignor to Milwaukee Gas Specialty Company, Milwaukee, Wis., a corporation of Wisconsin Application September 10, 1943, Serial No. 501,737

12 Claims. (Cl. 29—44)

This invention relates to machine tools and refers particularly to a semiautomatic turret lathe of the type forming the subject matter of the copending application of Eugene E. Meusy, Serial No. 350,559, filed August 3, 1940, now Patent No. 2,379,096, granted June 26, 1945.

The turret lathe of the aforesaid Meusy application is equipped with means for automatically reciprocating and indexing the turret through one cycle of operation. The cycle is manually started and the mechanism functions automatically to reciprocate the turret and sequentially present the tools carried by the turret to the work.

One of the essential elements of the mechanism is a so-called job cam, the contour of which is determined by the character of the work to be performed by the tools mounted at the different stations of the turret. One revolution of this job cam constitutes a cycle.

Through suitable linkage intermittent rotary motion of the job cam successively reciprocates the turret to present first one and then the next of the tools carried thereby to the work.

The operation of the mechanism is under the direction of an electrical control which incorporates switches opened and closed by rotation of the job cam shaft.

The turret lathe of the aforesaid Meusy application, however, only provided for control of the turret and did not include any means for operating or controlling the cross-feed slide. As is well known to those skilled in the art, the machining operations performed on turret lathes in many cases require the performance of work which can only be done by tools mounted on a cross slide, the motion of which is transverse to that of the turret reciprocation.

It is therefore an object of this invention to provide means for automatically operating and controlling the cross slide of a turret lathe in coordination with the semiautomatic reciprocation and indexing of the turret.

More specifically, it is an object of this invention to provide a combination hydraulic and electric control for the cross slide of a turret lathe or other similar machine tool by which the tool or tools carried by the cross slide can be automatically brought into operative relation with the work in a predetermined timed relationship with the functioning of the turret or other work performing part of the machine tool.

Another object of this invention is to provide a control of the character described which is tied in with the control for the turret of a semi- automatic turret lathe so that the entire functioning of the machine is under one control.

Still another object of this invention is to provide a control for the cross slide of a turret lathe whereby a single or a double cross slide function may be effected at any stage in the cycle of turret reciprocation and whereby the number of cross slide functions occurring during the cycle may be altered to accommodate jobs of different types.

With the above and other objects in view which will appear as the description proceeds, this invention resides in the novel construction, combination and arrangement of parts substantially as hereinafter described, and more particularly defined by the appended claims, it being understood that such changes in the precise embodiment of the herein disclosed invention may be made as come within the scope of the claims.

The accompanying drawings illustrate one example of the physical embodiment of the invention constructed in accordance with the best modes so far devised for the practical application of the principles thereof, and in which:

Figure 1 is a front view of a turret lathe embodying this invention;

Figure 2 is a cross-sectional view taken through Figure 1 on the plane of the line 2—2;

Figures 3 and 4 together constitute a complete diagrammatic illustration of the entire control system and wherein Figure 3 illustrates particularly the control for the cross slide and Figure 4 the control for the turret;

Figure 5 is a detail perspective view illustrating the trip levers which control initiation of the cross slide operation; and Figure 6 is a detail view in top plan of the limit switches and their actuators.

Referring now particularly to the accompanying drawings, in which like numerals indicate like parts, the numeral 5 designates generally a turret lathe provided with the usual spindle head 6, the spindle of which is adapted to be driven in either direction by a reversible spindle motor 7. A turret 8 mounted on a carriage 9 is reciprocable across the bed 10 of the lathe to successively present the tools (not shown) carried at the different stations of the turret to the work held in the spindle chuck.

The bed 10 also mounts a cross slide 11 adjustable along the length of the bed in the usual manner by rotation of a hand wheel 12 and reciprocable transversely to bring one or the other of two tools 13 and 14 into operative relation with the work.

It is, of course, understood that the cross slide is provided with an adjusting screw 15 by which initial adjustments can be manually effected and that the tools are individually adjustable on the slide to accommodate work of different sizes. It is also to be understood that while, in the embodiment of the invention illustrated, the cross slide is equipped with two tools, where a single cross slide function is required, one or the other of the tools may be omitted.

Where two cross slide functions are required, the transverse reciprocation of the cross slide is first in one direction and then the other from the neutral position or zone in which the slide is illustrated in Figure 2. These two operations may follow in direct sequence or they may occur at intervals spaced by intervening turret operations.

The turret 8 is mounted in the customary manner for rotation on a vertical axis fixed with respect to its carriage 9 and ratchet means (not shown) operates to index the turret from station to station as a consequence of reciprocation of the turret.

The turret carriage 9 may be reciprocated manually, but for automatic operation it is reciprocated by intermittent rotation of a job cam 16 as in the aforesaid copending application of Eugene E. Meusy. This cam is fixed on a shaft 17 journaled in bearings carried by a bracket 18 preferably attached to an adjacent pedestal of the lathe, and through a medially pivoted lever 19 translates rotation of the cam into the reciprocation of the carriage.

The contour of the cam 16 is determined by the character of the work to be performed and, as will be readily apparent, when the cam follower on the lever 19 is in a depression of the cam as shown in Figure 1, the carriage and turret are retracted and when the follower is on a high point of the cam, the carriage is advanced to present a tool to the work. One complete revolution of the cam constitutes a cycle for the machine.

A cam motor 20 drives the job cam through a speed reducer 21, the power takeoff of which is connected to the cam shaft by a transmission belt 22.

Inasmuch as the manner in which reciprocation of the turret carriage is accomplished through the function of the control mechanism including the job cam forms no part of this invention and is clearly illustrated and described in the aforesaid copending application of Eugene E. Meusy, it is unnecessary to describe this mechanism in detail. Consequently, only so much of the electrical control for this mechanism as is necessary to bring out the complete functioning of the machine will be specifically referred to in addition to the description already given.

Attention is now specifically directed to the cross slide. Power means are provided to reciprocate the cross slide and while this power means may take any suitable form, in the present instance it comprises a hydraulic motor 23, the piston of which is connected through a rod 24 with the cross slide. Hence, reciprocation of the piston of the hydraulic motor directly reciprocates the cross slide.

The power to operate the hydraulic motor is derived from a pump 25 of any suitable type which may be mounted in juxtaposition to the lathe as in a housing 26. Fluid is supplied to the pump from a reservoir 27 and the outlet of the pump is connected to the hydraulic motor through and under the control of a plurality of spool type valves 28, 29, 30 and 31. The valves 28, 29 and 30 are all biased to one position as indicated by the arrows in Figure 3 and are electromagnetically actuated to the opposite position upon energization of their solenoids 28', 29' and 30'.

The valve 31, which controls the direction in which the piston of the hydraulic motor 23 moves upon the application of pressure on the hydraulic motor, has its spool shifted from one position to the other by hydraulic pressure under the control of the valve 30 which may be referred to as a pilot control valve.

A pressure line 32 leading from the outlet of the pump has a pressure regulating valve 33 incorporated therein. The bypass outlet of this pressure regulating valve is connected by a return line 34 to the reservoir while its outlet is connected directly with the inlet 35 of the pilot control valve 30 and with the inlet of a back pressure valve 36. The outlet of the back pressure valve is connected to the inlet of the control valve 28, and when the spool of the control valve 28 is in its normal position to which it is biased and in which it is shown in Figure 3, a return passage is provided from its inlet through the valve and back to the reservoir.

However, when its solenoid 28' is energized and the spool is shifted to the right fluid pressure is applied at the inlet 37 of the valve 29. The position of the spool of this valve 29 determines the speed with which the cross slide is reciprocated by the hydraulic motor. When its spool is in its normal position to which it is biased and in which it is illustrated in Figure 3, it permits a direct path for the fluid pressure through the valve 29 to the inlet 37' of the direction control valve 31, but it blocks the free return path leading from the outlet 38 of the valve 31.

Hence, when the spool of the valve 29 is in its normal position the return flow of fluid from the hydraulic motor is through one or the other of two metering valves 39 (depending upon the direction in which the piston of the motor is traveling). The adjustment of the metering valves determines the rate of speed of the hydraulic motor.

To facilitate an understanding of how the position of the valve 29 determines if the speed of the hydraulic motor is to be fast or slow, attention is directed to the fact that the portion 40 of its spool blocks the return line 41 which provides a return path for the fluid from either end of the hydraulic motor parallel to the return path through the metering valves 39. Thus, when the spool of the valve 29 is in its normal position shown, the speed of the motor is reduced by virtue of the restriction imposed upon the return flow by the metering valve 39 which is then in the return line. But when the solenoid 29' of the valve 29 is energized and the spool is drawn to the left the return line 41 is opened and the metering valves 39 are bypassed. Consequently, whenever the solenoid 29' is energized the speed of the hydraulic motor is faster than it is when the solenoid 29' is deenergized.

As will be hereinafter more fully described, the control, as illustrated herein, is so set up that the initial operation of the cross slide is to the left as viewed in Figures 2 and 3 or toward the operator, which brings the tool 13 into operative relation with the work. Thus, at the start of the cycle, the spool of the direction determining valve 31 is to the right as shown in Figure 3 so that its middle compartment 42 connects its inlet 37' with its outlet 43. Fluid pressure is, therefore, so applied to the hydraulic motor as to cause its piston to impart a leftward motion to the cross slide.

The return flow from the hydraulic motor during leftward motion of the cross slide is back to the reservoir through one of the metering valves 39 until energization of the solenoid 29' bypasses the metering valve by withdrawing the blocking portion 40 of the valve 29 in the manner hereinbefore described. At the end of the leftward stroke of the cross slide a limit switch 44 is snapped and as a result the solenoid 30' of the pilot control valve 30 is energized to shift the spool of the direction controlling valve 31 leftward from its position shown in Figure 3.

The electrical controls by which this actuation of the limit switch 44 accomplishes energization of the solenoid 30' to actuate the pilot control valve will be hereinafter described.

In consequence to the response of the pilot control valve to energization of the solenoid 30', fluid pressure from the inlet 35 of the valve 30 is conducted through its medial compartment 45 to its outlet 46. This places pressure on the right hand end of the spool of valve 31 shifting it to have its middle compartment 42 connect its inlet 37' with its outlet 47. Thereupon, pressure is conducted to the left hand end of the hydraulic motor to draw the cross slide toward the right back to its neutral position or zone where it may be stopped if the nature of the work to be performed so requires, or it may continue to the right to engage the other tool 14 with the work.

Inasmuch as the system illustrated has been set up to effect the latter result, the limit switch 44 is not again thrown until the cross slide has moved to the limit of its rightward motion and the tool 14 has completed its operation. Thereupon, the limit switch 44 is snapped back to its position illustrated in Figure 3 and in consequence the solenoid 30' is deenergized allowing the pilot control valve 30 to return to its normal position. When this occurs, the inlet 35 of the pilot control valve is reconnected with its outlet 48 and fluid pressure is conducted to the left hand end of the direction control valve 31 to push its spool back to its initial position.

During the adjustment of the machine to a particular piece of work, it is necessary that the cross slide be freely movable back and forth and to this end a manual shutoff valve 49 is connected across the ports of the hydraulic motor. Opening of this valve allows free reciprocation of the slide as will be readily apparent.

It is to be observed that the initiation of the operation of the hydraulic system just described requires energization of the solenoid 28' to draw the spool of the control valve 28 to its position at which fluid pressure can be applied on the hydraulic motor. The electrical control by which energization of this solenoid and the other solenoids of the valves is accomplished in properly timed relationship to the operation of the entire mechanism will now be described.

Mounted on the shaft 17 of the job cam is a compound trip lever 50. As best illustrated in Figure 5, this trip lever comprises two arms each provided with a hub, one telescoping over the other. Consequently, the angular relationship between the arms is adjustable. If the two arms are in line as shown in Figures 3 and 4 there is, in effect, but a single trip lever. If the arms are separated, as indicated in dotted lines in Figurge 5, two trip levers are provided.

Extending into the path of this trip lever or levers is the actuator 51 of a single pole, double throw switch 52. This switch 52 is biased to a position at which its set of contacts 53 are normally closed and operation of its actuator 51 by the trip lever 50 closes its other set of contacts 54.

As long as the switch 52 remains in its normal position the cross slide control remains dormant and only the turret reciprocating mechanism operates. Thus, if the work being performed did not require cross-feed operations the lever 50 could be adjusted along the cam shaft out of the path of the actuator 51.

Inasmuch as the control for the reciprocation of the turret is the same as in the aforesaid copending Meusy application, it includes a manual selector switch 55 by which the lathe may be set for either manual or semi-automatic operation. With this selector switch set for semiautomatic operation, as shown in Figure 4, closure of the normally open "start" contacts of a start-stop switch 56 effects operation of the spindle motor 7 and the cam motor 20.

With the closure of the "start" contacts the cycle is started by energization of a master relay 58. To maintain the relay 58 energized the "start" contacts must be held down long enough to enable the cam motor to turn the cam shaft to the point where a switch 59 in parallel with the "start" contacts controlled by a cam 60 on the cam shaft closes. This cam has one high spot for opening the switch 59 so that once it moves far enough to permit closure of the switch 59 the switch remains closed until the cam shaft has made one complete revolution.

Response of the master relay 58 in the manner set forth starts the cam motor providing that the work being done does not require a cross slide operation before the turret operations are begun. Hence, the circuit controlling the starting of the cam motor is tied in with that part of the system given over to control of the cross slide. To this end, the coil 61 of the cam motor starter switch 62 has one side directly connected to line L3 and its other side connected through a conductor 63 with the normally closed contacts 53 of switch 52. From these normally closed contacts the energizing circuit for the coil 61 is completed through conductor 64 which leads to contact 65 on the selector switch 55 engaged by one of its contactors 66 and then back through conductor 67 to the contacts of the master relay 58 and out to line L1.

Thus it follows that the position of the switch 52 as well as the closure of the contacts of the master relay 58 determines when the cam motor shall operate. The position of the trip lever or levers 50 with relation to the 360° of rotation of the cam shaft determines when in the cycle the cam motor shall be idle to allow for the cross slide function or functions. Whenever the lever or levers depress the actuator of the switch 52 its normally closed contacts 53 are opened and its normally open contacts 54 are closed. This stops the cam motor substantially instantaneously due to the provision for plugging.

Plugging of the cam motor is accomplished as follows: With the opening of the contacts 53 of switch 52 the coil 61 of the cam motor starter switch 62 is deenergized and concomitantly with the resulting opening of switch 62 a circuit is established to energize the coil 68 of a plugging switch 69. This circuit beginning with line L3 extends along a conductor 70 to one side of the coil 68 and continues from the other side thereof through contactor 71 of the selector switch 55 and on the bar 82 and adapted to push up on the actuator 100 of the change-over switch. It is to be observed that the cam 99 has a flat top. The length of this flat top determines the duration for which the change-over switch 90 is held up closing its contacts 101 and 102 and opening its contacts 89.

When the change-over switch is so lifted during the rightward passage of the cross slide through its neutral zone the closure of its contacts 102 which are in parallel with its contacts 89 maintains energization of the coil of the relay 93 through a shunt circuit consisting of a conductor 103 which leads from the common terminals of the contacts 86 and 87 to the then bridged contacts 102 and from there directly to conductor 64.

As the cross slide continues in the rightward direction through its neutral zone the change-over switch 90 returns to its normal position and the circuits remain undisturbed until the approaching cam 98 opens the speed control switch 84. The opening of this switch deenergizes the coil of relay 79 which in turn allows the spool of speed control valve 29 to return to its normal position placing one of the metering valves 39 in the return line leading from the hydraulic motor so that further rightward travel of the cross slide is at reduced speed.

At the completion of the operation of tool 14 a stop 104 adjustably mounted on the bar 82 actuates the direction controlling limit switch 44 to reverse the direction of movement of the cross slide. This actuation of the switch 44 replaces the speed controlling switch 84 with the speed controlling switch 80 in the circuit controlling energization of the solenoid 79 so that the metering valves are again bypassed and the speed of the cross slide motion is increased.

Also, as a result of actuation of the switch 44, the coil of relay 93 is deenergized opening the contacts 94 and 95, the opening of the former having effected the change in the direction of cross slide motion.

With the deenergization of the coil of relay 93 its normally closed contacts 105 reclose. This reclosure of the contacts 105 renders the change-over switch 90 effective to restart the cam motor and stop the cross slide. Thus, as the leftward return stroke continues and the cam 99 actuates the change-over switch 90, closure of its contacts 101, as a result thereof, completes the energizing circuit for the coil 61 of the start switch 62, by virtue of the establishment of a shunt circuit which comprises a conductor 106 connected to conductor 63, the closed contacts 105, a conductor 107, the closed contacts 101 and back to conductor 64 via conductor 91 and the closed contacts 54 of switch 52.

As long as the cam 99 holds the change-over switch in its position at which the contacts 101 and contacts 105 on relay 93 are closed, the cam motor operates independently of the position of switch 52. Hence, the cam 99 must hold the change-over switch in its actuated position long enough to permit the cam motor to move the trip finger 50 out of engagement with the actuator of switch 52. In so doing, contacts 54 are broken and contacts 53 are closed, providing a circuit for the coil 61 of the start switch 62 which is now independent of the change over switch 90.

When contacts 54 are broken, power from L1 through line 64 is carried through contacts 102, through line 103 to the common connections of contacts 86 and 87 of switch 44 to the relay 78, thus maintaining operating power on the cross slide till the cam 99 permits the change-over switch to return to its normal position. The separating of contacts 102 breaks the line to relay 78, which in turn removes the source of pressure from the hydraulic motor, thus completing the de-energizing process for the cross slide controls, and leaving the circuit in its original starting condition.

Attention is directed to the presence of a manually controlled switch 108 which, upon being closed, short circuits the contacts 105. Thus, if this switch is closed the change-over switch 90 is rendered effective to stop the cross slide function upon return of the cross slide to its neutral zone after completion of the operation by its tool 13. This switch is therefore closed where the work being performed calls for only one cross slide operation or where the two cross slide operations do not follow in direct sequence at which time the two sections of the trip lever 50 are disposed angularly with respect to each other as shown in dotted lines in Figure 5.

Where the work calls for only one cross slide operation the stop 104 is adjusted along the bar 82 to the right, as viewed in Figure 3, to a position such that as the tool 13 is being retracted the stop 104 trips the switch 44 to place its contacts 86 and 87 in the positions illustrated in Figure 3, during the time the cam 99 is under the cam follower 100 and the switches 101 and 102 are closed. With the closure of the switch 101 the cam motor is restarted, the circuit therefor being completed through the closed switch 108 and being maintained by reclosure of the switch 53 brought about by the cam motor disengaging the arm 50 from the switch actuator 51.

The tripping of the switch 44 to close the contacts 86 and open the contacts 87, as hereinbefore noted, effects a reversal in the direction of travel of the cross slide which, due to the adjustment of the stop 104, takes place while the cam follower 100 is upon the flat of the cam 99 so that the consequent retrograde leftward motion of the tool slide obtains only until the cam 99 rides out from under its follower 100.

*Brief résumé of operation*

The control as illustrated in Figures 3 and 4 is dormant, but with the selector switch 55 set for semiautomatic operation. Assuming that the machine has been properly set up, that is, the proper tools are in place on the turret and the cross slide; to start the machine the operator depresses the push button start switch 56. This effects energization of the master relay 58. With energization of the master relay the starter switch 62 controlling operation of the cam motor 20 closes.

Simultaneously with the closure of the cam motor starter switch 62 one of the two spindle motor switches 74 and one of the two spindle motor switches 75 closes to start the spindle motor and revolve the work in the proper direction.

The cam motor 20 drives the job cam 16 which also may be referred to as a timing cam, and is so termed in the claims. Rotation of the job or timing cam 16 effects reciprocation of the turret through the medium of the pivoted arm 19 and in a manner more particularly described in the aforesaid copending application of Eugene Meusy. Reciprocation of the turret indexes the same in the customary manner through the functioning of pawl and ratchet mechanism (not shown).

One complete revolution of the job or timing cam constitutes a cycle and at the end of the cycle the holding circuit maintaining the coil of the starter switch energized is broken by the opening of switch 59.

At the point in the cycle where the cross slide functions are to take place, the trip lever 50 strikes the actuator of the two-position switch 52 to open its contacts 53 and close its contacts 54. This actuation of the two-position switch 52 deenergizes the coil of the motor starter switch 62 and effects the plugging of the motor 20 to stop the same with the trip lever 50 holding the switch 52 in its actuated position.

Actuation of the switch 52 starts the cross slide functions by effecting energization of the solenoid 28' to shift the spool of valve 28. Such actuation of the valve 28 applies fluid pressure at the right of the piston of the hydraulic motor 23 causing the cross slide to move leftward and bring its tool 13 into engagement with the work.

During the initial free motion of the cross slide, that is, while the tool 13 is being brought up to the work, the reciprocation of the cross slide by the hydraulic motor is fast as the metering valve 39 then in circuit is bypassed. The bypassing of the metering valve is the result of energization of the solenoid 29' which takes place at the start of the cycle.

Just before the tool 13 begins to cut, the crossfeed speed control switch 80 is opened by the cam 81. This effects deenergization of the solenoid 29' so the continuing leftward motion of the cross slide is slow.

At the completion of the leftward stroke limit switch 44 is actuated by the stop 92. This changes the direction of travel by effecting energization of the solenoid 30'. Energization of the solenoid 30' changes the position of the pilot valve 30 which in turn shifts the position of the spool of the valve 31, this latter action effecting the change in direction of motion. The cross slide then moves rapidly toward the right inasmuch as the stated actuation of the limit switch 44 effected reenergization of solenoid 29'.

As the cross slide moves through its neutral zone, it actuates the change-over switch 90. If the manual switch 108 is closed the actuation of the change-over switch restarts the cam motor and stops the cross slide. When the switch 108 is open, the change-over switch operates to restart the cam motor by the shunt circuit through line 64, contacts 54, line 91, contacts 101, line 107, contacts 105, line 106 and line 63. Now, when the cross slide is moving in the rightward direction, relay 93 is energized, thus breaking contacts 105, so no circuit is completed through the cam motor starter switch coil 61 when the change-over switch is actuated during rightward movement.

Consequently, the actuation of the change-over switch 90 during the rightward travel of the cross slide is ineffective to stop the cross slide. Rightward travel thus continues and just before the tool 14 begins to cut the speed of the feed is reduced by virtue of the cam 98 opening the switch 84 and effecting deenergization of the solenoid 29'.

At the end of the rightward travel the limit switch 44 is again actuated, this time by stop 104 and the direction of motion is again reversed. With this last actuation of the limit switch 44, relay 93 is deenergized so that when the change-over switch 90 is again actuated, a control circuit is closed to reenergize the coil of the motor starter switch 62.

The cam 98 which rides under the actuator 100 of the change-over switch 90 to actuate it is shaped to hold the switch in its actuated position long enough to insure the motor 20 carrying the trip lever 50 away from the actuator of the two-position switch 52. Thereupon, the two-position switch 52 resumes its normal position and the operation of the machine continues until the completion of the cycle at which time the switch 59 is opened to deenergize the coil of the motor starter switch 20.

As noted hereinbefore, if it is desired to have the change-over switch 99 effective during travel of the cross slide in both directions, the switch 108 is closed which shunts out the switch 105 of relay 93 and thus enables the change-over switch to complete the energizing circuit for the coil 61 of the motor starter switch each time it is actuated by the cam 99. This latter arrangement is particularly advantageous when two cross slide functions are to be spaced by intervening turret functions. In this case the two sections of the trip lever are separated and arranged at angles to each other as illustrated in dotted lines in Figure 5.

If it is desirable to change the sequence of operations so the stroke starts with movement to the right, contacts 105 controlled by relay coil 93 can be changed from normally closed contacts to normally open contacts. In this way, contacts 105 would make change-over switch 90 effective during right travel, and ineffective during left travel, since relay 93 is energized for right travel and deenergized for left travel.

This is opposite in sequence to the action hereinbefore described thus providing a means for changing the sequence of the strokes.

From the foregoing description taken in connection with the accompanying drawings, it will be readily apparent to those skilled in the art that this invention provides an automatic control of the entire operation of a turret lathe including the cross slide and thereby materially enlarges the scope of the work capable of being performed on the semiautomatic turret lathe forming the subject matter of the aforesaid copending Meusy application; and further that by virtue of this invention the control may be set to effect cross slide functioning at any point in the cycle, and that two cross slide functions may take place either in direct sequence or spaced by intervening turret functions, but in all cases in coordinated timed relation with the functions of the turret carried tools.

What I claim as my invention is:

1. In a semiautomatic turret lathe: a turret reciprocable toward and from the work; power means for reciprocating the turret including an electric motor; a cross slide reciprocable transversely of the lathe for presenting tools laterally to the work; a hydraulic motor for reciprocating the cross slide; a source of fluid pressure; valve means for connecting the source of fluid pressure with the hydraulic motor; other valve means for determining the direction of reciprocation of the cross slide by the hydraulic motor; an electrical control system for said valve means and said electric motor; a switch connected in said control system adapted upon actuation to stop the electric motor and actuate the valve means so as to initiate operation of the hydraulic motor in one direction; means coordinated with reciprocation of the turret for actuating said switch whereby the functioning of the cross slide is timed with the reciprocation of the turret; and means governed by reciprocation of the cross slide for controlling the valve means which determines the direction of motion imparted to the cross slide by the hydraulic motor.

2. In a semiautomatic turret lathe having a turret reciprocable toward and from the work and a cross slide reciprocable transversely thereof: means for reciprocating the turret including a timing cam; a motor for driving said cam; a starter switch for the motor; power means for reciprocating the cross slide; an electrical control for said power means including a two-position switch; a control circuit for the starter switch of the cam motor having one set of contacts of said two-position switch connected therein so that operation of the cam motor depends upon the position of said two-position switch; a control circuit for instituting operation of the cross slide power means having the other set of contacts of said two position switch connected therein; means biasing said two-position switch to its position at which its first designated set of contacts is normally closed; and means moving with the timing cam and operable to actuate said two-position switch to its other position to stop the cam motor and institute the functioning of said power means.

3. In a machine tool: two separate tool carriers each movable to bring a tool into cooperative relation with the work; separate drive means for the tool carriers; manually controlled means for starting one of said drive means; an electric switch; control circuits governed by the switch for stopping the manually started drive means and starting the other drive means; means driven by the manually started drive means for actuating the switch; another switch; control circuits governed by said other switch for countermanding the effect of the first designated switch by restarting the manually started drive means and stopping the other drive means; and means movable with the tool carrier driven by said other drive means for actuating said other switch.

4. In a lathe: a cross slide for presenting tools laterally to work mounted in the lathe; power means for reciprocating the cross slide in both directions from a neutral position; an electrical control system for governing the functioning of said power means including a limit switch operable upon the cross slide reaching the limits of its reciprocation for reversing its direction of travel; a change-over switch operable by passage of the cross slide through its neutral position; electrical control instrumentalities governed by said last named switch and operable upon actuation thereof during reciprocation of the cross slide through its neutral position for stopping reciprocation of the cross slide; and other electrical control instrumentalities governed by the limit switch for rendering said change-over switch ineffective during reciprocation of the cross slide in one direction so that reciprocation of the cross slide in both directions and back to its neutral position follows in one continuous uninterrupted sequence.

5. In a machine tool of the character described: a tool carrier reciprocable in both directions from a neutral position; power means for so reciprocating said tool carrier; an electrical control for said power means including a control circuit incorporating a two-position control switch biased to its position at which the electrical control is dormant and the tool carrier stationary in its neutral position; means actuated by the operation of the machine tool for reversing the position of said control switch to initiate the operation of the power means to impart reciprocation to the tool carrier; a change-over switch connected in the control circuit and operable upon actuation thereof to effect cessation of said power means; an actuator movable in unison with the tool carrier for actuating said change-over switch; and means effective during movement of the tool carrier in one direction for breaking the circuit through the change-over switch so as to render the same ineffective to stop the power means whereby cessation of the power means is possible only during travel of the tool carrier in the other direction.

6. In a turret lathe having a reciprocable turret and a transversely reciprocable cross slide: power means for effecting reciprocation of the turret; power means for effecting reciprocation of the cross slide; an electrical control governing the operation of both said power means; a manually operable switch for initiating operation of the power means for reciprocating the turret; a timing cam driven by the turret reciprocating power means; a switch connected in the electrical control operable upon actuation thereof to effect stopping of the turret reciprocating power means and starting of the cross slide reciprocating means; a trip lever moving with the timing cam to actuate said switch at a predetermined point in the cycle of operation; a change-over switch connected in the electrical control adapted upon actuation thereof to restart the power means for the turret and stop the power means for the cross slide; means for actuating said change-over switch including a part movable in unison with the cross slide and positioned to effect actuation of the change-over switch as the cross slide travels through its neutral zone; and means for establishing a maintaining circuit whereby the power means for the cross slide is uninterrupted during travel thereof through its neutral zone in one direction.

7. In a turret lathe having a turret reciprocable to present tools to the work and a cross slide reciprocable transversely to present tools laterally to the work: means for effecting reciprocation of the turret including an electric motor and a timing cam driven by the motor; an electromagnetic starter switch for the motor; control circuits including a manually operable start switch for effecting closure of the motor starter switch; power means for reciprocating the cross slide; control circuits for governing the operation of said cross slide power means including a two-position switch biased to a position at which the cross slide power means is dormant; a trip lever moving in unison with the timing cam for actuating said two-position switch out of its biased position; control circuits governed by said two-position switch for instituting operation of the cross slide power means and opening the motor starter switch upon actuation of the two-position switch by said trip lever; a change-over switch operable upon actuation thereof to reclose the motor starter switch and render the cross slide power means inoperative; and means moving in unison with the cross slide for actuating said change-over switch during passage of the cross slide through its neutral zone and for maintaining the change-over switch actuated long enough to effect operation of the motor the extent required to disengage the trip lever from the actuator of the two-position switch.

8. In a semiautomatic turret lathe: a turret reciprocable toward and from the work; power means for reciprocating the turret; a cross slide reciprocable transversely of the lathe for presenting tools laterally to the work; power means for reciprocating the cross slide; a source of energy for said cross slide reciprocating power means; control means for connecting the cross slide reciprocating power means with its source of energy; other control means for determining the direction of reciprocation of the cross slide by its power means; a control system for the two power means; a control element in said system adapted upon actuation to stop the turret reciprocating power means and actuate said first named control means so as to initiate operation in one direction of the cross slide reciprocating power means; means coordinated with reciprocation of the turret for actuating said control element whereby the functioning of the cross slide is timed with the reciprocation of the turret; and means governed by reciprocation of the cross slide for controlling the second mentioned control means which determines the direction of motion imparted to the cross slide by its power means.

9. In a machine tool of the character described: a turret having a plurality of tool stations and adapted to be indexed to successively bring the tools carried thereby into alignment with the work; power means for reciprocating the turret a number of times necessary to successively engage all of the tools carried thereby with the work and thus complete a work cycle; a cross slide for engaging a tool carried thereby transversely with the work; power means for reciprocating the cross slide; means for synchronizing the reciprocation of the turret and cross slide so that the cross slide function may take place while the turret is in its advanced work engaging position, said means comprising control circuits governing the operation of said two power means; an actuating element driven by the turret reciprocating power means and operable at any point in the work cycle for rendering the control circuits operative to stop the turret in its advanced work engaging position and start the cross slide reciprocating power means to bring a tool on the cross slide into and out of engagement with the work; and another actuating element moving with the cross slide and operable to render the control circuits operative to restart turret reciprocation after completion of the cross slide function.

10. In a semiautomatic turret lathe: a turret mounted for reciprocation; a cam for reciprocating the turret, said cam being so shaped that a predetermined motion thereof effects a predetermined number of reciprocations of the turret constituting a work cycle; means for driving the cam; a cross slide; means for reciprocating the cross slide; control means for automatically stopping the cam driving means to thus interrupt and stop reciprocation of the turret and for starting the means for reciprocating the cross slide; an actuator for said control means; means for adjustably and drivingly connecting the actuator with said cam so that the actuator moves with the cam in a predetermined relation with respect thereto to institute the functioning of the control means to stop reciprocation of the turret and start reciprocation of the cross slide at any predetermined point in the work cycle and with the turret at a corresponding location within its range of travel; control means for stopping the cross slide driving means and for restarting the cam driving means to effect cessation of cross slide reciprocation and resumption of turret reciprocation; an actuator for said last named control means; and means drivingly connecting said last named actuator with the cross slide.

11. In a machine tool: two separate tool carriers each movable to bring a tool into cooperative relationship with the work; separate drive means for bringing each tool carrier into and out of engagement with the work, the drive means for one of the tool carriers being constrained to effect a normally fixed cyclic operation of the tool carrier driven thereby; manually controlled means for starting said designated drive means; a control circuit for stopping said designated drive means and concomitantly starting the other drive means including a controlling element; an actuator for said controlling element; means adjustably and drivingly connecting the actuator with said designated drive means so that said controlling element may be actuated thereby to render said control circuit operative to interrupt and stop the cyclic operation of said designated drive means and start the other drive means with the designated drive means at any preselected point in its cycle of operation determined by the setting of the adjustable driving connection between the actuator and said designated drive means and with the tool carrier driven thereby at a corresponding location within its range of travel; another control circuit for automatically stopping the other drive means and restarting the designated drive means to continue its cyclic operation; a controlling element for said other control circuit; and means movable with the tool carrier driven by said other drive means for actuating said last mentioned controlling element after a predetermined operation of said other drive means to activate said other control circuit to automatically stop said other drive means and restart the designated drive means to continue its cyclic operation.

12. In a semiautomatic turret lathe having a turret and a cross slide: drive means for reciprocating the turret; manually operable means for starting said drive means; automatically timed means for stopping said drive means after it has effected reciprocation of the turret a sufficient number of times to constitute a work cycle, during which all the tools carried by the turret are presented to the work; separate drive means for reciprocating the cross slide; control circuits for interrupting and stopping the turret reciprocating drive means and instituting the operation of the cross slide reciprocating drive means; control means for said control circuits including an actuator adjustably and drivingly connected with the drive means for reciprocating the turret so that said actuator moves in a predetermined timed relation with the turret to render said control circuits operative to stop the turret and start the cross slide at any predetermined point in the work cycle and with the turret at a corresponding location within its range of travel; and means for stopping the cross slide reciprocating drive means and restarting the turret reciprocating drive means to thus effect cessation of cross slide reciprocation and resumption of turret reciprocation, said means including an actuator movable in unison with the cross slide and operable to activate said control circuits to automatically effect the stated resumption of turret reciprocation upon completion of the cross slide operation, said turret reciprocation then continuing until the automatically timed means ends the work cycle.

LOERWOOD C. WASSON.